(12) United States Patent
Seo et al.

(10) Patent No.: US 9,889,410 B2
(45) Date of Patent: Feb. 13, 2018

(54) TUBULAR BRAID, HOLLOW FIBER MEMBRANE USING THE SAME, AND MANUFACTURING METHOD THEREOF

(71) Applicant: Cheil Industries Inc., Gumi-si, Gyeongsangbuk-do (KR)

(72) Inventors: Chang Min Seo, Gumi-si (KR); Gyeong Mo Lee, Gumi-si (KR); Myoung Won Park, Gumi-si (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 592 days.

(21) Appl. No.: 13/896,264

(22) Filed: May 16, 2013

(65) Prior Publication Data

US 2013/0248440 A1 Sep. 26, 2013

Related U.S. Application Data

(63) Continuation of application No. PCT/KR2011/008629, filed on Nov. 11, 2011.

(30) Foreign Application Priority Data

Nov. 18, 2010 (KR) .................. 10-2010-0115187
Nov. 11, 2011 (KR) .................. 10-2011-0117348

(51) Int. Cl.
*D04C 1/06* (2006.01)
*B01D 69/08* (2006.01)
(Continued)

(52) U.S. Cl.
CPC .......... *B01D 69/081* (2013.01); *B01D 69/02* (2013.01); *B01D 69/08* (2013.01); *D04C 1/06* (2013.01);
(Continued)

(58) Field of Classification Search
CPC ...... B01D 63/02; B01D 63/027; B01D 69/08; B01D 69/10; B01D 2239/02;
(Continued)

(56) References Cited

U.S. PATENT DOCUMENTS 4,061,821 A * 12/1977 Hayano .................. B01D 69/08
210/500.23
4,214,994 A * 7/1980 Kitano .................. B01D 69/10
210/490
(Continued)

FOREIGN PATENT DOCUMENTS

KR 10-1998-0033594 A 7/1998
KR 10-2004-0008935 A 1/2004
(Continued)

OTHER PUBLICATIONS

Written Opinion of the International Searching Authority for International Application No. PCT/KR2011/008629, filed Nov. 11, 2011, Applicant Cheil Industries, Inc., WOISA dated May 15, 2012 (6 pgs.).
(Continued)

*Primary Examiner* — Pranav N Patel
(74) *Attorney, Agent, or Firm* — Lewis Roca Rothgerber Christie LLP

(57) ABSTRACT

A tubular braid, a hollow fiber membrane using the same, and a manufacturing method thereof. A hollow fiber membrane can maximize or increase adhesion between a polymer coating film and a tubular braid; significantly reduce degradation of film properties caused by non-uniform coating, that is, reduce leakage; obtain a higher percent rejection; and achieve high water permeability since the hollow fiber membrane has a larger inner diameter.

28 Claims, 1 Drawing Sheet

(51) Int. Cl.
*D04C 3/00* (2006.01)
*B01D 69/02* (2006.01)

(52) U.S. Cl.
CPC ............ *D04C 3/00* (2013.01); *B01D 2325/24* (2013.01); *B01D 2325/40* (2013.01); *D10B 2505/04* (2013.01)

(58) Field of Classification Search
CPC ................................ B01D 2239/0216; B01D 2239/0604–2239/064; B01D 2239/1225; B01D 2239/1233; B01D 2325/40
See application file for complete search history.

(56) References Cited

U.S. PATENT DOCUMENTS

| | | | |
|---|---|---|---|
| 6,354,444 B1 * | 3/2002 | Mahendran | B01D 67/0011 210/490 |
| 2009/0206026 A1 | 8/2009 | Yoon et al. | |
| 2010/0024631 A1 | 2/2010 | Lee et al. | |

FOREIGN PATENT DOCUMENTS

| | | | |
|---|---|---|---|
| KR | 10-2008-0074038 A | | 8/2008 |
| KR | WO2008097011 | * | 8/2008 |

OTHER PUBLICATIONS

English Translation of Written Opinion of the International Searching Authority for International Application No. PCT/KR2011/008629, filed Nov. 11, 2011, Applicant Cheil Industries, Inc., WOISA dated May 15, 2012 (7 pgs.).

International Search Report for International Application No. PCT/KR2011/008629, filed Nov. 11, 2011, Applicant Cheil Industries, Inc., ISR dated May 14, 2012 and dated May 15, 2012 (3 pgs.).

English Translation of International Search Report for International Application No. PCT/KR2011/008629, filed Nov. 11, 2011, Applicant Cheil Industries, Inc., ISR dated May 14, 2012 and dated May 15, 2012 (2 pgs.).

International Preliminary Report on Patentability for International Application No. PCT/KR2011/008629, filed Nov. 11, 2011, Applicant Cheil industries, Inc., WOISA dated May 15, 2012 (7 pgs.).

English Translation of International Preliminary Report on Patentability for International Application No. PCT/KR2011/008629, filed Nov. 11, 2011, Applicant Cheil Industries, Inc., WOISA dated May 15, 2012 (8 pgs.).

* cited by examiner

TUBULAR BRAID, HOLLOW FIBER MEMBRANE USING THE SAME, AND MANUFACTURING METHOD THEREOF

CROSS-REFERENCE TO RELATED APPLICATIONS

This application is a continuation application of International Application Number PCT/KR2011/008629, filed on Nov. 11, 2011, which claims priority to and the benefit of Republic of Korea Patent Application Number 10-2010-0115187, filed on Nov. 18, 2010, and Republic of Korea Patent Application Number 10-2011-0117348, filed on Nov. 11, 2011, the entire content of all of which is incorporated herein by reference.

FIELD

Aspects of embodiments of the present invention relate to a tubular braid, a hollow fiber membrane using the same, and a manufacturing method thereof.

BACKGROUND

In hollow fiber membrane filtration generally used in the art, a hollow fiber membrane is immersed in water to be treated and separates impurities from the water. Such a hollow fiber membrane has been broadly used in the field of precise filtration for production of sterile water, drinking water, distilled water, and the like, and has recently expanded in application range to sewage/wastewater treatment, solid/liquid separation in septic tanks, suspended solid removal from industrial wastewater, and filtration of stream water, industrial water, swimming pool water, and the like.

Hollow fiber membranes can be classified into a reinforced membrane type, in which a polymer resin film is coated on a tubular fabric or braid, and a single membrane type, in which a hollow fiber membrane is composed only of polymer resin films without using a reinforcing material such as tubular fabrics or braids. The complex film type membrane employs the tubular fabric or braid as a reinforcing material and thus exhibits excellent mechanical properties.

U.S. Pat. No. 6,354,444 discloses a hollow fiber membrane, in which a polymer solution is applied only to an outer surface of a hollow tubular fabric or braid formed of polyethylene terephthalate (PET) fibers or the like and small pores are formed through phase separation to improve tensile strength.

Although such a hollow fiber membrane for water treatment manufactured using a reinforcing material has high tensile strength, it is difficult to obtain uniform coating of the polymer solution on the reinforcing material. As a result, this type of hollow fiber membrane can suffer from defects such as leakage or the like. In addition, upon exposure to impact or pressure for a long duration, the coating can be peeled off or damaged due to deterioration in adhesion between the tubular braid and the high molecular weight layer. Moreover, since it is difficult to coat the polymer solution on the inner side of the hollow fiber due to difficulty for polymers to reach an inner periphery of the hollow fiber upon coating of the polymer solution, contaminants having infiltrated into the hollow fiber membrane upon backwashing can contaminate the tubular braid.

SUMMARY

According to an aspect of embodiments of the present invention, a tubular braid is provided with a core to prevent or substantially prevent a leakage problem of hollow fiber membranes for water treatment, which are generally subjected to outer coating. According to further aspects of embodiments of the present invention, a hollow fiber membrane which is manufactured using a tubular braid including a core and has high water permeability, high adhesion, and high percent rejection, and a manufacturing method thereof, are provided.

According to another aspect of embodiments of the present invention, a hollow fiber membrane manufactured using the tubular braid and a method of manufacturing the same are provided.

According to another aspect of embodiments of the present invention, a hollow fiber membrane has improved adhesion between a tubular braid and a coating layer to prevent or substantially prevent delamination or damage of the coating layer, even upon repeated exposure to strong impact.

According to another aspect of embodiments of the present invention, in a hollow fiber membrane deterioration in film properties, such as leakage caused by uneven coating, and the like may be prevented or substantially prevented.

According to another aspect of embodiments of the present invention, a hollow fiber membrane has a high percent rejection through a polymer film evenly infiltrated into a tubular braid.

According to another aspect of embodiments of the present invention, a hollow fiber membrane is manufactured using a core and has a large inner diameter by preventing or substantially preventing a reduction of the inner diameter due to contraction upon or after coating of a polymer solution, thereby providing high water permeability.

According to another aspect of embodiments of the present invention, a hollow fiber membrane, in which a polymer solution infiltrates the hollow fiber membrane to prevent or substantially prevent contaminants having infiltrated into the membrane upon backwashing from contaminating the tubular braid, thereby significantly reducing contamination of the interior of the membrane.

An aspect of embodiments of the present invention relates to a tubular braid. According to one or more embodiments of the present invention, a tubular braid includes coarse monofilaments of 25 to 250 denier and multi-filaments of 0.5 to 5 denier, and is manufactured by arranging the coarse monofilaments and the multi-filaments on an outer surface of a core, and removing the core from the tubular braid.

The tubular braid may include 50 wt % to 99 wt % of the coarse monofilaments, and 1 wt % to 50 wt % of the multi-filaments.

Another aspect of embodiments of the present invention relates to a hollow fiber membrane formed using the tubular braid. According to one or more embodiments of the present invention, a hollow fiber membrane is formed by forming a polymer coating layer on the tubular braid, followed by removing the core from the tubular braid.

In one embodiment, the hollow fiber membrane may be manufactured by arranging monofilaments and multi-filaments on an outer surface of a core to prepare a tubular braid, providing a polymer solution to the tubular braid to infiltrate the tubular braid and reach an outer surface of the core, and removing the core from the tubular braid.

In one embodiment, the hollow fiber membrane may include coarse monofilaments of 25 to 250 denier and multi-filaments of 0.5 to 5 denier in a porous resin, and a polymer layer formed along an inner periphery of the hollow fiber membrane.

The coarse monofilaments may be distributed between the inner periphery and an outer periphery of the hollow fiber membrane.

In the hollow fiber membrane, at least 90% of the multi-filaments may be distributed within 80% of a total thickness from the inner periphery thereof.

The hollow fiber membrane may include a section in which the multi-filaments are distributed between the coarse monofilaments and the inner periphery thereof.

A denier ratio of the coarse monofilaments to monofilaments of the multi-filaments (e.g., PET multi-filaments) may be 5:1 to 500:1.

In one embodiment, the hollow fiber membrane may have an average inner diameter of 0.5 mm to 1.5 mm.

In one embodiment, a standard deviation of an inner diameter of the hollow fiber membrane may be 0.15 mm or less.

The porous resin may have an average pore diameter of 0.005 μm to 0.06 μm.

In one embodiment, the hollow fiber membrane may have an adhesion strength of at least 10 kgf/cm$^2$, and a bubble point of at least 2 bar.

A further aspect of the present invention relates to a method for manufacturing a hollow fiber membrane. According to one or more embodiments of the present invention, a method of manufacturing a hollow fiber membrane includes: preparing a tubular braid by arranging coarse monofilaments of 25 to 250 denier and multi-filaments of 0.5 to 5 denier on an outer surface of a core; bringing a polymer solution into contact with the prepared tubular braid to allow the polymer solution to infiltrate the tubular braid and reach the outer surface of the core; solidifying the polymer solution; and removing the core from the tubular braid.

The tubular braid may include 50 wt % to 99 wt % of the coarse monofilaments, and 1 wt % to 50 wt % of the multi-filaments.

According to aspects of embodiments of the present invention, a tubular braid is provided in which adhesion between the tubular braid and a coating layer is improved, deterioration of film properties, such as leakage due to non-uniform coating, may be prevented or substantially prevented, high percentage rejection and high water permeability may be achieved, and contamination of an interior of a hollow fiber membrane may be significantly reduced by preventing or substantially preventing contaminants having infiltrated into the membrane upon backwashing from contaminating the tubular braid. According to further aspects of embodiments of the present invention, a hollow fiber membrane manufactured using the same, and a manufacturing method thereof are provided.

DETAILED DESCRIPTION

Figure 1:
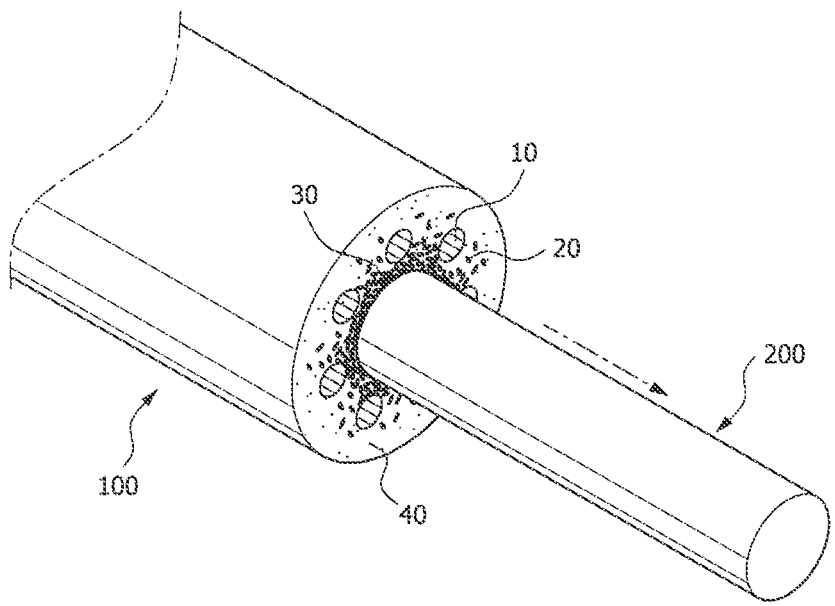
FIG. 1 is a schematic perspective view of a hollow fiber membrane including a tubular braid and a polymer resin layer deposited on a core, according to an embodiment of the present invention.

Some exemplary embodiments of the present invention are described herein with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

According to one or more embodiments of the present invention, a hollow fiber membrane is manufactured using a core to allow a polymer solution to infiltrate a tubular braid such that concurrent (e.g., simultaneous) and uniform or substantially uniform coating of the polymer solution can be achieved on inner and outer surfaces of the hollow fiber membrane without deformation of the tubular braid.

The tubular braid may be prepared by knitting or weaving coarse monofilaments and multi-filaments on an outer surface of the core.

The core may be formed of a metal or polymer resin. In one embodiment, the core may be prepared by coating a water-soluble resin on a surface of the metal or the polymer resin. In another embodiment, the core may be prepared by coating a general-purpose resin on the surface of the metal. In another embodiment, the core may be prepared by coating a water-soluble resin on the surface of the metal. In yet another embodiment, the core may be prepared by coating a general-purpose resin on the surface of the metal and coating a water-soluble resin on the general-purpose resin. In yet another embodiment, the core may be prepared using a water-soluble polymer. In yet another embodiment, the core may be a porous monolayer.

The metal may be selected from among copper, aluminum, iron, titanium, nickel, gold, silver, platinum, tin, lead, and the like, without being limited thereto.

The polymer resin and the general-purpose resin may be selected from polyvinylidene fluoride (PVDF), polycarbonate, polystyrene, polyester, polyolefin, polyamide, poly(meth)acrylate, polyvinyl chloride, glass fibers, and the like, without being limited thereto.

The water-soluble polymer may be selected from hydroxyethyl cellulose, polyvinyl alcohol, ethylene vinyl alcohol, highly amorphous vinyl alcohol, polyethylene oxide, and polyethylene glycol, without being limited thereto. In one embodiment, the core is formed of a water-soluble polymer, and the core may be removed by dissolving the core in water. In another embodiment, the core may be removed by physically removing the core.

The core may have a diameter corresponding to an inner diameter of the hollow fiber membrane to be manufactured. In one embodiment, the core may have an average diameter of 0.5 mm to 1.5 mm. In one embodiment, the core has an average diameter of 0.7 mm to 1.3 mm.

The outer surface of the core is surrounded by the tubular braid, which, in one embodiment, may be formed by knitting or weaving the coarse monofilaments and the multi-filaments. In another embodiment, the tubular braid may be manufactured by inserting the core into the braid upon knitting or weaving.

The coarse monofilaments, in one embodiment, may have a fineness of 25 to 250 denier. In one embodiment, the coarse monofilaments have a fineness of 50 to 150 denier. Within this range, the polymer solution can easily infiltrate the tubular braid until the polymer solution reaches the outer surface of the core in manufacturing the hollow fiber membrane. In one embodiment, the coarse monofilaments may have a fineness of 75 to 120 denier.

The multi-filaments may have a fineness of 0.5 to 5 denier. In one embodiment, the multi-filaments have a fineness of 2 to 4 denier. Further, according to one or more embodiments of the invention, instead of multi-filaments having a circular cross-section, multi-filaments having an irregular cross-section may be used to facilitate infiltration of the polymer solution.

In one embodiment, the tubular braid may comprise 50 wt % to 99 wt % of the coarse monofilaments and 1 wt % to 50 wt % of the multi-filaments. In one embodiment, the tubular braid comprises 70 wt % to 90 wt % of the coarse monofilaments and 10 wt % to 30 wt % of the multi-filaments. Within this range, the tubular braid easily permits infiltration of the polymer solution.

The coarse monofilaments and the multi-filaments may be polyester, polyamide, or polyolefin filaments, without being limited thereto.

The tubular braid having the core placed at the center thereof may be used in manufacturing of the hollow fiber membrane.

Another aspect of the invention relates to a hollow fiber membrane using the tubular braid. The hollow fiber membrane may be manufactured by forming a polymer coating layer on the tubular braid, and removing the core from the tubular braid.

In one embodiment, the hollow fiber membrane may be manufactured by knitting or weaving coarse monofilaments of 25 to 250 denier and multi-filaments of 0.5 to 5 denier on the outer surface of the core to prepare a tubular braid, and bringing a polymer solution into contact with the prepared tubular braid to infiltrate the tubular braid until the polymer solution reaches the outer surface of the core.

The polymer solution may be prepared by mixing a polymer resin and an organic solvent. Examples of the polymer resin may include polysulfone, polyethersulfone, sulfonated polysulfone, polyvinylidene fluoride (PVDF), polyacrylonitrile (PAN), polyimide, polyamideimide, polyesterimide resins, and the like, without being limited thereto. These may be used alone or in combination of two or more thereof.

Examples of the organic solvent may include dimethylacetamide, dimethylformamide, N-methyl-pyrrolidone, and the like, without being limited thereto.

The polymer solution may be prepared by mixing 10 wt % to 30 wt % of the polymer resin and 70 wt % to 90 wt % of the organic solvent. The polymer solution, in one embodiment, may further include suitable additives, as needed. In one embodiment, the polymer solution may be prepared at a temperature of 30° C. to 100° C., and, in one embodiment, may be prepared at a temperature of 40° C. to 70° C. Further, the polymer solution may have a viscosity of 5,000 cps to 50,000 cps.

The method of bringing the polymer solution into contact with the prepared tubular braid may be realized by coating or depositing the polymer solution on the tubular braid through a spinneret, spraying, dipping, or the like.

After completion of coating the polymer solution, in one embodiment, a coating layer including the tubular braid may have an average thickness of 300 μm to 500 μm. In this case, the polymer solution can deeply infiltrate the tubular braid to reach the core, thereby achieving concurrent (e.g., simultaneous) uniform or substantially uniform coating of the interior and exterior of the tubular braid. Further, the presence of the core allows infiltration of the polymer material into the braid without deformation of the tubular braid.

After completion of coating the polymer solution, the polymer solution may be solidified by a typical method.

During solidification of the polymer solution, the core is inside the hollow fiber membrane and the coated tubular braid is outside the core. Then, the core may be removed by a physical or chemical method. For example, as shown in FIG. 1, a core 200 may be removed from a hollow fiber membrane 100 by pulling the core therefrom, or by dissolving the core in a solvent. For example, if the core is made of a water-soluble polymer, the core may be removed by dissolving in water. As a result, the hollow fiber membrane has a hollow structure in which a vacancy is formed at a place where the core has been removed, as shown in FIG. 2.

Figure 2:
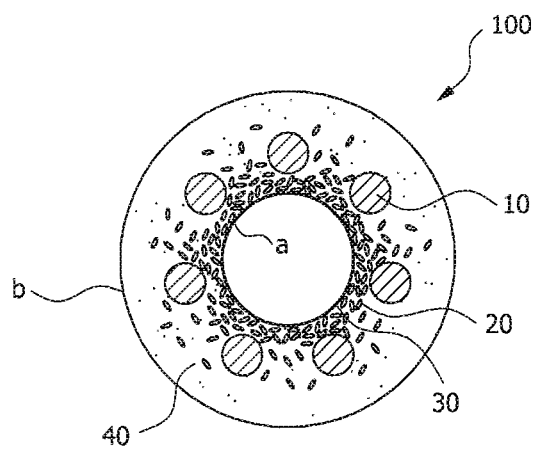
FIG. 2 is a schematic cross-sectional view of the hollow fiber membrane of FIG. 1, shown having the core removed.

FIG. 2 is a schematic cross-sectional view of a hollow fiber membrane according to one embodiment. As shown, the hollow fiber membrane 100 includes coarse monofilaments 10 of 25 to 250 denier and multi-filaments 20 of 0.5 to 5 denier in a porous resin 40 formed by solidifying a polymer solution, and a polymer layer 30 formed along an inner periphery (a) of the hollow fiber filament. In the hollow fiber membrane of this embodiment, since the polymer solution deeply infiltrates the tubular braid to reach the core, the polymer layer 30 can be formed on the inner periphery (a). The polymer layer may also be formed on an outer periphery (b) of the hollow fiber membrane. The polymer layer 30 is formed inside the hollow fiber membrane and prevents or substantially prevents contaminants having infiltrated into the fiber membrane upon backwashing from contaminating the tubular braid, thereby reducing the degree of contamination inside the membrane. The polymer layer 30 may have an average thickness of 0.05 μm to 100 μm.

The coarse monofilaments 10 may be distributed between the inner periphery (a) and the outer periphery (b) of the hollow fiber membrane 100. In one or more embodiments, the number of coarse monofilaments 10 is 2 to 20, and, in one embodiment, may be 4 to 16. In one embodiment, the number of coarse monofilaments 10 is 6 to 14. In one or more embodiments, the coarse monofilaments may be arranged at regular intervals or distances. The coarse monofilaments 10 may have a fineness of 25 to 250 denier. Within this range, the polymer solution can easily infiltrate the tubular braid, and the coarse monofilaments can be uniformly or substantially uniformly arranged at intervals (e.g., constant intervals) along the inner periphery (a) of the membrane. In one embodiment, the coarse monofilaments 10 may have a fineness of 50 to 150 denier, and, in one embodiment, may have a fineness of 75 to 120 denier.

The multi-filaments 20 may be irregularly distributed in the hollow fiber membrane 100. In one embodiment, the multi-filaments 20 are more densely distributed near the inner periphery of the hollow fiber membrane 100 by being pushed toward the inner periphery (a) of the hollow fiber membrane 100 by temperature and pressure during infiltration and solidification of the polymer solution. In one or more embodiments, 90% or more, for example 95% or more, of the multi-filaments 20 may be distributed within 80% of a thickness from the inner periphery (a) of the hollow fiber membrane 100. Due to irregular distribution of the multi-filaments 20, the hollow fiber membrane 100 may have a section in which the multi-filaments 20 are present between the coarse monofilaments 10 and the inner periphery (a) of the hollow fiber membrane 100, or may have a section in which the multi-filaments 20 are not present between the coarse monofilaments 10 and the inner periphery (a) of the hollow fiber membrane 100. The multi-filaments 20 may also be present between the coarse monofilaments 10. The multi-filaments 20 may have a fineness of 0.5 to 5 denier. In this way, the use of the multi-filaments 20 provides an uneven cross-sectional shape, thereby facilitating infiltration of the polymer solution into the tubular braid.

An average denier ratio of the coarse monofilament 10 to monofilaments of the multi-filaments 20 may range from 5:1 to 500:1, and, in one embodiment, may be from 10:1 to 200:1. In one embodiment, an average denier ratio of the coarse monofilament 10 to monofilaments of the multi-filaments 20 may range from 20:1 to 60:1. Within this range, the polymer solution can easily infiltrate the tubular braid.

In one embodiment, the hollow fiber membrane 100 may have an average inner diameter of 0.5 mm to 1.5 mm. In one or more embodiments, the hollow fiber membrane 100 is manufactured using the core and thus does not suffer from reduction in inner diameter due to shrinkage upon or after coating the polymer solution, thereby achieving high water permeability.

In one embodiment, the hollow fiber membrane 100 may have a standard deviation of 0.15 mm or less in inner diameter. In one or more embodiments of the present invention, the use of the core can maintain an original shape of the hollow fiber membrane without deformation of the inner diameter of the hollow fiber membrane 100.

The hollow fiber membrane has a structure wherein the coarse monofilaments 10 and the multi-filaments 20 are embedded in the porous resin 40, which is formed by solidification of the polymer solution. The porous resin 40 may have an average pore diameter of 0.005 µm to 0.06 µm, and, in one embodiment, may is 0.01 µm to 0.05 µm. Within this range, the hollow fiber membrane 100 has excellent water permeability and high percent rejection.

In one or more embodiments, the hollow fiber membrane 100 may have an adhesion strength of 10 kgf/cm$^2$ or more and a bubble point of 1.5 bar or more. In one or more embodiments, the hollow fiber membrane 100 may have an adhesion strength of 15 kgf/cm$^2$ or more and a bubble point of 2 bar or more. As such, since the hollow fiber membrane 100 according to embodiments of the present invention has a considerably high adhesion strength and bubble point, the hollow fiber membrane 100 can significantly reduce leakage.

The present invention is explained in further detail below with reference to some examples. It should be understood that these examples are provided for illustration only and are not to be in any way construed as limiting the present invention. A description of details readily apparent to those skilled in the art will be omitted.

Example 1

A total of 12 coarse Nylon monofilaments having a fineness of 100 denier, and a total of 12 PET multi-filaments (75 denier/24 filaments) were knitted on a plasticized polyvinyl alcohol (PVA) core having a diameter of 1.1 mm, thereby preparing a tubular braid. With the core placed in the tubular braid, a polymer material was coated on the tubular braid through a spinneret until a coating layer including the tubular braid had a thickness of 350 µm to 450 µm. As a coating solution, a polymer solution prepared by combining 20 wt % of PVDF (Solef 1015) and 80 wt % of NMP was used. The temperature of the polymer solution was adjusted to 60° C., the ejection rate of the polymer solution was set to 20 g/min, and the polymer solution had a viscosity of 39,000 cps to 42,000 cps at 30° C. After completion of coating the polymer solution, the tubular braid was passed through a solidification furnace to solidify the polymer solution, and washed with water at 80° C. to remove the plasticized PVA core from the braid. Physical properties of the prepared hollow fiber membrane were evaluated according to the following methods, and results are shown in Table 1.

1. Measurement of Water Permeability

1) A sample was prepared. Three strands of the membranes having a length of 200 mm were prepared.
2) The membrane is folded in half to insert in an acrylic tube having a diameter of 10 mm and a length of 100 mm. One end of the membrane is sealed with epoxy (or urethane). The other end of membrane is open.
3) The open end as described is mounted in a water permeability testing apparatus.
* Water permeability testing apparatus: A liquid in a pressure vessel is discharged when a pressure is applied to the liquid, and the discharged liquid flows into the tube. A membrane is hung at the end of the tube. The water permeability is obtained by measuring the amount of permeated liquid from the membrane sample.
4) Fill the tube with water and hang the sealed part of the membrane on the beaker to collect the permeate.
5) Apply a pressure of 1 bar to the vessel containing water therein, and measure the amount of water discharged from the acrylic tube.
6) Measure the weight of permeate in the beaker and calculate water permeability by measuring the amount of discharged water.

2. Adhesion Strength

1) Prepare a hollow fiber membrane having a length of 50 mm.
2) Prepare a urethane tube having a length of 50 mm and a diameter of 10 mm.
3) Put 10 mm of the membrane in the urethane tube and potting.
4) A gage length for instron (UTM) was 70 mm. 10 mm of the end of the membrane was wrapped with a paper so as not to break.

Any material providing suitable gripping without deteriorating the membrane can be used instead of the paper.

When the membrane is secured by Instron, the membrane should be straight from the upper part to the bottom part. Further, upper/bottom grip should not be swayed during the operation of Instron.
5) The crosshead speed was 50 mm/min, The maximum tensile stress is divided by its unit area, so the maximum tensile stress is registered as the adhesion strength.

3. Measurement of Bubble Point

1) A sample was prepared in the same manner as in measurement of the water permeability using a membrane and an acrylic tube.
2) As in measurement of the water permeability, the tube was connected to a pressure vessel. Here, the pressure vessel was filled only with nitrogen.
3) Pressure was gradually increased from 0.5 bar by 0.5 bar at an interval of about 2 minutes using a regulator.
4) By immersing the membrane and the acrylic tube in water, a pressure at which bubbles were generated around the membrane was recorded.
5) A pressure point of generating bubbles was recorded as the bubble point.

4. Scanning Electron Microscopy (SEM)

1) A specimen was mounted on a stage using a carbon tape to photograph SEM images.
2) A gap was not formed between the carbon tape and the specimen and between the specimen and the stage when mounting the specimen on the stage.
3) After mounting the specimen on the stage, cold coating was performed using an ion-coater.

4) Images, OD/ID/thickness, and a pore size on an outer surface of the specimen were measured via SEM.

5. Measurement of Percent Rejection

UV [PerkinElmer Lambda 25 UV/Vis Spectrometer]

1) Prepare two strands of the hollow fiber membrane having a length of 100 mm.

2) Insert the membrane in an acrylic tube having an internal diameter 10 mm and a length of 100 mm; and seal one end of the membrane with paraffin (or urethane). The other end of the membrane is potted in the acrylic tube to prepare a sample.

3) Mount the sample in a water permeability testing apparatus.

4) Prepare a solution for measuring rejection ratio, as follows:

① Preparation of styrene bead solution (containing styrene beads of a constant size) Styrene bead: 0.03 μm Thrice distilled water+Styrene bead+surfactant The surfactant prevents agglomeration of the styrene beads (a very small amount of surfactant was used).

After mixing the three components, the mixture was agitated for about 1 hour.

5) The styrene bead solution was placed in a pressure vessel and compressed at a pressure of 0.5 atm to pass through the membrane. After about 1 minute, the solution was collected as a specimen.

6) Sampling was performed using a base liquid (thrice distilled water or RO water), a feeding solution (styrene beads), and the specimen to provide samples to a UV-Visible spectrometer.

7) In the UV-Visible spectrometer, after a base line was set using the base liquid (distilled water or RO water), the feeding solution and the specimen were evaluated as to absorbance.

8) The % rejection can be obtained by using a UV-Visible spectrometer and can be calculated by the following formula:

Rejection (%)=(1−$Cf/Cp$)*100

Cf: absorbance of the feeding solution, and

Cp: absorbance of the specimen passed through the membrane.

When the percent rejection obtained from this equation is 90% or more, the membrane is evaluated as having an effective percent rejection, and the pore size of the membrane can be indirectly estimated therefrom.

Comparative Example 1

A hollow fiber membrane was prepared in the same manner as in Example 1 except that a total of 24 PET multi-filaments (300 denier/96 filaments) were knitted without using the core. An empty core space had a diameter of about 0.85 mm. After coating a polymer material through a spinneret, a coating layer including the tubular braid had a thickness of about 600 μm.

Although some embodiments of the present invention have been described herein, the present invention is not limited to these embodiments and can be realized in various ways. Further, it should be understood by those skilled in the art that various modifications, variations, and alterations can be made without departing from the spirit and scope of the present invention. Accordingly, these embodiments are given by way of illustration only, and should not be construed in any way as limiting the present invention.

What is claimed is:

1. A tubular braid comprising coarse monofilaments of 25 to 250 denier and multi-filaments made of monofilaments of 0.5 to 5 denier, the coarse monofilaments and the multi-filaments being arranged such as to permit infiltration of a polymer solution into the tubular braid, the multi-filaments being irregularly and more densely distributed toward an inner periphery of the tubular braid, the tubular braid manufactured by arranging the coarse monofilaments and the multi-filaments on an outer surface of a core, and removing the core from the tubular braid.

2. The tubular braid according to claim 1, wherein the tubular braid comprises 50 wt % to 99 wt % of the coarse monofilaments, and 1 wt % to 50 wt % of the multi-filaments.

3. The tubular braid according to claim 1, wherein the core is formed of a metal, a polymer resin, or a combination thereof.

4. The tubular braid according to claim 3, wherein the core prepared by coating a water-soluble resin on a surface of the metal or polymer resin.

5. The tubular braid according to claim 3, wherein the core is prepared by coating a general-purpose resin on a surface of the metal.

6. The tubular braid according to claim 5, wherein the general-purpose resin includes a water-soluble resin coating formed thereon.

7. The tubular braid according to claim 1, wherein the core is formed of a water-soluble polymer.

8. The tubular braid according to claim 1, wherein the core is a porous monolayer.

9. The tubular braid according to claim 1, wherein the core has a diameter of 0.5 mm to 1.5 mm.

10. A hollow fiber membrane comprising the tubular braid according to claim 1, the hollow fiber membrane having an adhesion strength of at least 10 kgf/cm² and a bubble point of at least 2 bar.

11. A hollow fiber membrane comprising the tubular braid of claim 1, and manufactured by arranging the monofilaments and the multi-filaments on the outer surface of the core to prepare the tubular braid, providing a polymer solution to the tubular braid to infiltrate the tubular braid and reach the outer surface of the core, and removing the core from the tubular braid.

TABLE 1

| | Outer diameter (mm) | Inner diameter (mm) | Water permeability (LMH/bar) | Adhesion strength (kgf/cm²) | Bubble point (bar) | Pore size (μm, SEM) | Percent rejection (%) |
|---|---|---|---|---|---|---|---|
| Example 1 | 2.1 | 1.25 | 1000 | 16 | 2 | 0.03 | 97 |
| Comparative Example 1 | 2.1 | 0.85 | 600 | 12 | 1 | 0.04 | 95 |

12. The hollow fiber membrane according to claim 11, wherein the core is formed of a metal, a polymer resin, or a combination thereof.

13. The hollow fiber membrane according to claim 12, wherein the core is prepared by coating a water-soluble resin on a surface of the metal or polymer resin.

14. The hollow fiber membrane according to claim 12, wherein the core is prepared by coating a general-purpose resin on a surface of the metal.

15. The hollow fiber membrane according to claim 14, wherein the general-purpose resin includes a water-soluble resin coating formed thereon.

16. The hollow fiber membrane according to claim 11, wherein the core is formed of a water-soluble polymer.

17. The hollow fiber membrane according to claim 11, wherein the core is a porous monolayer.

18. A hollow fiber membrane comprising the tubular braid of claim 1 in a porous resin, and a polymer layer formed along an inner periphery of the hollow fiber membrane.

19. A method of manufacturing a hollow fiber membrane, the method comprising:
    preparing a tubular braid by arranging coarse monofilaments of 25 to 250 denier and multi-filaments made of monofilaments of 0.5 to 5 denier on an outer surface of a core;
    bringing a polymer solution into contact with the prepared tubular braid to infiltrate the tubular braid and reach the outer surface of the core;
    solidifying the polymer solution; and
    removing the core from the tubular braid,
    wherein the multi-filaments are irregularly and more densely distributed toward an inner periphery of the tubular braid.

20. The method according to claim 19, wherein the tubular braid comprises 50 wt % to 99 wt % of the coarse monofilaments, and 1 wt % to 50 wt % of the multi-filaments.

21. The method according to claim 19, wherein the core is removed by physical force or by dissolving the core in a solvent.

22. The tubular braid according to claim 1, wherein the coarse monofilaments are of 50 to 150 denier.

23. The tubular braid according to claim 1, wherein the coarse monofilaments are of 75 to 120 denier.

24. The tubular braid according to claim 1, wherein the monofilaments of the multi-filaments are of 2 to 4 denier.

25. The tubular braid according to claim 1, wherein a denier ratio of the coarse monofilaments to the monofilaments of the multi-filaments is 5:1 to 500:1.

26. The tubular braid according to claim 25, wherein the denier ratio of the coarse monofilaments to the monofilaments of the multi-filaments is 10:1 to 200:1.

27. The tubular braid according to claim 25, wherein the denier ratio of the coarse monofilaments to the monofilaments of the multi-filaments is 20:1 to 60:1.

28. The tubular braid according to claim 2, wherein the tubular braid comprises 70 wt % to 90 wt % of the coarse monofilaments, and 10 wt % to 30 wt % of the multi-filaments.

* * * * *